United States Patent [19]

von Bonin et al.

[11] 4,198,333

[45] Apr. 15, 1980

[54] STABLE SUSPENSIONS OF INORGANIC FILLERS IN ORGANIC POLYHYDROXYL COMPOUNDS CONTAINING COMPLETELY OR PARTIALLY NEUTRALIZED CARBOXYL GROUPS

[75] Inventors: Wulf von Bonin, Leverkusen; Peter Vehlewald, Leichlingen, both of Fed. Rep. of Germany

[73] Assignee: Bayer Aktiengesellschaft, Leverkusen, Fed. Rep. of Germany

[21] Appl. No.: 936,673

[22] Filed: Aug. 24, 1978

[30] Foreign Application Priority Data

Sep. 2, 1977 [DE]  Fed. Rep. of Germany ....... 2739620

[51] Int. Cl.$^2$ ............................................. C08L 33/02
[52] U.S. Cl. ............................ 260/33.2 R; 260/37 R; 260/40 R; 260/40 TN; 260/42.14; 260/42.43; 260/42.53; 260/42.57
[58] Field of Search ............. 260/42.43, 33.2 R, 37 R, 260/40 R, 40 TN, 42.57, 42.53, 42.14

[56] References Cited

U.S. PATENT DOCUMENTS

| | | | |
|---|---|---|---|
| 3,637,909 | 1/1972 | von Bonin et al. .................. | 260/873 |
| 3,767,587 | 10/1973 | Claussen et al. ................. | 260/301.23 |
| 3,773,708 | 11/1973 | Takahashi et al. ................ | 260/42.14 |
| 3,849,362 | 11/1974 | Economy et al. ............... | 260/33.2 R |
| 3,966,672 | 6/1976 | Gaylord ............................ | 260/42.14 |
| 3,971,753 | 7/1976 | Frechtling et al. ............... | 260/42.14 |
| 4,023,981 | 5/1977 | Perronin et al. .................. | 260/42.14 |
| 4,042,558 | 8/1977 | von Bonin et al. ............... | 260/42.14 |
| 4,077,804 | 3/1978 | Vanyo ............................... | 260/42.53 |
| 4,088,663 | 5/1978 | Yankee ............................. | 260/408 |

*Primary Examiner*—Maurice J. Welsh
*Attorney, Agent, or Firm*—Gene Harsh; Joseph C. Gil; R. Brent Olson

[57] ABSTRACT

The instant invention is directed to a suspension which is stable in storage comprising:
(1) 0.5 to 80%, by weight, based on the total suspension, of an inorganic filler in
(2) 20 to 99.5%, by weight, based on the total suspension, of polyhydroxyl compounds containing aliphatic or cycloaliphatic combined hydroxyl groups, wherein said polyhydroxyl compounds (2) contain from 0.05 to 10% by weight based on (1)+(2) of a graft polymer and stabilizer which was produced by the free radical polymerization of (a) from 1 to 35%, by weight, based on the graft polymer, of an olefinically unsaturated carboxylic acid and
(b) from 0 to 60%, by weight, based on the graft polymer, of other olefinically unsaturated monomers, in the presence of
(c) from 5 to 99%, by weight, based on the graft polymer, of polyhydroxyl compounds, wherein the carboxyl groups of the graft polymer are completely or partially neutralized by organic or inorganic bases.

24 Claims, No Drawings

STABLE SUSPENSIONS OF INORGANIC FILLERS IN ORGANIC POLYHYDROXYL COMPOUNDS CONTAINING COMPLETELY OR PARTIALLY NEUTRALIZED CARBOXYL GROUPS

BACKGROUND OF THE INVENTION

The present invention relates to stable suspensions of inorganic fillers in polyhydroxyl compounds which are suitable for the production of polyurethanes and to the use thereof for the production of polyurethane resins.

The combination of organic and inorganic raw materials to form a composite material has been known industrially for a long time, for example, when filling rubbers or thermoplastics with inorganic fillers, pigmenting lacquers with inorganic pigments or producing molded plastics material.

In contrast to the above-mentioned rubbers, thermoplastics or molded plastics which are essentially solids and in which the fillers are substantially unchanged in their distribution after incorporation, the polyols generally used in polyurethane chemistry are liquid substances which are only converted into solids or rubbery products after reaction with polyisocyanates.

Inorganic fillers usually have specific gravities above two while the specific gravities of the polyols are generally around one. There is thus such a large difference between the specific gravities of the two components that suspensions of even very finely ground inorganic pigments deposit sediments in the polyols after a certain period. This is particularly true when the polyols have the relatively low viscosities generally required in practice for processing.

This problem represents a considerable obstacle when using inorganic fillers in polyurethane chemistry. Understandably, it is desirable to have such suspensions in a form which is storage stable thus making an additional mixing process for homogenizing the suspensions during storage or before use unnecessary.

An object of the present invention is therefore to prepare storage stable suspensions of inorganic fillers in polyols of the type used in the production of polyurethanes. This object could be achieved in accordance with the teachings of U.S. patent application Ser. No. 856,075 filed on Nov. 30, 1977 by dispersing the inorganic fillers in specific polyhydroxyl compounds containing carboxyl groups, described in more detail below and by optionally diluting the suspensions thus formed with other polyhydroxyl compounds. Polyhydroxyl compounds containing carboxyl groups may be produced simultaneously with the dispersing process in this case. During further processing by this method, it was found that the carboxyl group content could lead to turbulence if the suspensions produced in this way were to be converted into polyurethanes.

However, it has now been surprisingly found that stable and undisturbed suspensions which may be converted into polyurethanes are also formed if the carboxyl groups are completely or partially neutralized by organic or inorganic bases.

DESCRIPTION OF THE INVENTION

The present invention relates to storage stable suspensions which comprise (1) from 0.5 to 80%, by weight, based on the total suspension, of an inorganic filler in (2) from 20 to 99.5%, by weight, based on the total suspension, of polyhydroxyl compounds containing aliphatic or cycloaliphatic hydroxyl groups, wherein said polyhydroxyl compounds (2) contain from 0.05 to 10%, and preferably from 0.1 to 3%, by weight, based on (1)+(2) of a graft polymer, which has been produced by the free-radical polymerization of (a) from 1 to 35%, by weight, preferably from 2 to 20% by weight, based on the graft polymer, of an olefinically unsaturated carboxylic acid and (b) from 0 to 60%, by weight, preferably from 5 to 40% by weight, based on the graft polymer, of other olefinically unsaturated monomers in the presence of (c) from 5 to 99%, by weight, based on the graft polymer of polyhydroxyl compounds, wherein the carboxyl groups of the graft polymer are completely or partially neutralized by an organic or inorganic base.

The present invention also relates to the use of the dispersions obtained by the process as synthesis components in the production of foamed and unfoamed polyurethane resins by the isocyanate polyaddition process.

Suitable inorganic fillers include, for example, kaolins, talcum, mica, tuff, lava, powdered asbestos, glass, chalk, dolomite, bentonites, alkali metal or ammonium phosphates and polyphosphates, alkaline earth metal phosphates and polyphosphates, carbon black, graphite, cements, calcium oxide and hydroxide, calcium sulphates, flue-dust, slag, powdered rock, titanium dioxide, iron oxides, aluminum oxides and hydroxides, quartz sand and powdered shale, silicates, and the like. Particularly suitable for the process according to the invention, apart from talcum, kaolin and aluminum hydroxides, are fillers which contain calcium carbonate, such as chalk or dolomite.

The term "inorganic fillers" as used in the present invention also includes the known inorganic pigments. It also includes inorganic fillers in which the surfaces have been pretreated with organic or inorganic compounds of a neutral, basic or acid character, for example, for the purpose of modifying their charge or hydrophilic character. The inorganic fillers are generally solid, inorganic substances which may consist of particles in the form of needles, platelets or spherical pellets or of irregularly shaped particles and which may be amorphous, metamorphous or crystalline and in which the particle diameters are generally below 10 microns. The residue left on a 40 micron-sieve according to DIN 53,195 should generally be less than 1% by weight.

The continuous phases used for preparing the filler suspensions in the process according to the invention are carboxyl-containing polyhydroxyl compounds of the kind which can be obtained by grafting olefinically unsaturated carboxylic acids and, optionally, other vinyl monomers onto polyhydroxyl compounds of the kind generally known in polyurethane chemistry. The carboxyl containing polyhydroxyl materials are preferably used in admixture with polyhydroxyl compounds which are free from carboxyl groups.

The polyhydroxyl compounds which are modified by the grafting reaction mentioned above or also those used for mixing are preferably polyols of the kind generally known in polyurethane chemistry which are liquid at room temperature.

These compounds generally have from 2 to 8, and preferably 2 to 3, hydroxyl groups and molecular weights of above 500, generally from 500 to 10,000 and preferably between 1800 and 7000. Polyol mixtures may also be used which, in addition to containing polyols within the molecular weight range indicated above, also contain polyols with a lower molecular weight, preferably between 62 and 500, but these preferably amount to less than 70% by weight in the mixture. The preferred polyhydroxyl compounds are polyhydroxy polyesters, polyhydroxy polyethers, polyhydroxy polyacetals, polyhydroxy polycarbonates and polyhydroxy polyester amides conforming to the definitions given above. The polyhydroxy polyethers are particularly preferred, firstly because they generally have a relatively low viscosity and secondly because they form a good basis for grafting.

Suitable polyesters with hydroxyl groups include, for example, reaction products of polyvalent, preferably divalent alcohols, to which trivalent alcohols may be added, and polyvalent, preferably divalent carboxylic acids. Instead of free polycarboxylic acids, the corresponding polycarboxylic acid anhydrides or corresponding polycarboxylic acid esters of lower alcohols or mixtures thereof may, of course, be used for preparing the polyester. The polycarboxylic acids may be aliphatic, cycloaliphatic, aromatic and/or heterocyclic and they may be substituted, e.g., by halogen atoms, and/or unsaturated.

The following are examples of suitable acids: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid which may be mixed with monomeric fatty acids, dimethyl terephthalate and terephthalic acid-bis-glycol esters. The following are examples of suitable polyvalent alcohols: ethylene glycol, propylene glycol-(1,2) and -(1,3), butylene glycol-(1,4) and -(2,3), hexanediol-(1,6), octanediol-(1,8), neopentylglycol, cyclohexane dimethanol (1,4-bis-hydroxymethylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol, and sorbitol, methylglycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones such as $\epsilon$-caprolactone or hydroxycarboxylic acids such as $\omega$-hydroxycaproic acid may also be used.

The polyethers used according to the invention which have at least 2, generally 2 to 8 and preferably 2 to 3 hydroxyl groups are also generally known and are prepared, for example, by polymerization of epoxides such as ethylene oxide, propylene oxide, butylene oxide, tetrahydrofuran, styrene oxide or epichlorohydrin, either each on its own, (e.g., in the presence of boron trifluoride) or, by addition of these epoxides, either as mixtures or successively, to starting components having reactive hydrogen atoms, such as water, alcohols, ammonia or amines. Suitable starting components include: ethylene glycol, propylene glycol-(1,3) or -(1,2), trimethylolpropane, 4,4'-dihydroxy-diphenylpropane, aniline, ethanolamine or ethylene diamine. Sucrose polyethers may also be used according to the invention, e.g., those described in German Auslegeschriften Nos. 1,176,358 and 1,064,938.

Polyethers modified with vinyl polymers, e.g., the compounds obtained by polymerization of styrene or acrylonitrile in the presence of polyethers as described in U.S. Pat. Nos. 3,383,351; 3,304,273; 3,523,093 and 3,110,695 and German Pat. No. 1,152,536 are also suitable, as well as polybutadienes which have hydroxyl groups. Suitable polyacetals include, for example, the compounds which can be prepared from glycols such as diethylene glycol, triethylene glycol, 4,4'-dioxyethoxydiphenyl dimethylmethane, hexanediol and formaldehyde. Suitable polyacetals for the purpose of the invention may also be prepared by the polymerization of cyclic acetals.

The polycarbonates with hydroxyl groups used may be of the kind known per se, for example, those which can be prepared by the reaction of diols such as propanediol-(1,3), butanediol-(1,4) and/or hexanediol-(1,6), diethylene glycol, triethylene glycol or tetraethylene glycol with diarylcarbonates, e.g., with diphenylcarbonate or phosgene.

Suitable polyester amides and polyamides include, for example, the predominantly linear condensates prepared from polyvalent saturated and unsaturated carboxylic acids or their anhydrides and polyvalent saturated and unsaturated amino alcohols, diamines, polyamines and mixtures thereof.

Representatives of these compounds which may be used according to the invention are known and have been described, for example, in High Polymers, Volume XVI, "Polyurethanes, Chemistry and Technology", by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Höchtlen, Carl-Hanser-Verlag, Munich, 1966, pages 45–71.

Mixtures of the above-mentioned compounds which contain at least two hydrogen atoms capable of reacting with isocyanates and have a molecular weight of from 500 to 10,000 may, of course, also be used, for example mixtures of polyethers and polyesters.

The starting components used according to the invention may also include compounds with molecular weights of from 62 to 500 which have at least two hydroxyl groups. These compounds also generally have from 2 to 8 hydroxyl groups, and preferably 2 or 3 hydroxyl groups.

The following are examples of such compounds: ethylene glycol, propylene glycol-(1,2) and -(1,3), butylene glycol-(1,4) and -(2,3), pentanediol-(1,5), hexanediol-(1,6), octanediol-(1,8), neopentyl glycol, 1,4-bis-hydroxymethylcyclohexane, 2-methyl-1,3-propanediol, glycerol, trimethylol propane, hexanetriol-(1,2,6), trimethylolethane, pentaerythritol, quinitol, mannitol and sorbitol and their ethoxylation and propoxylation products, diethylene glycol, triethylene glycol, tetraethylene glycol, polyethylene glycols with a molecular weight of up to 500, dipropylene glycol, polypropylene glycols with a molecular weight of up to 500, dibutylene glycol, polybutylene glycols with a molecular weight of up to 500, 4,4'-dihydroxy-diphenyl propane, dihydroxymethyl-hydroquinone, diethanolamine and triethanolamine.

Polyhydroxyl compounds in which high molecular weight polyadducts or polycondensates are finely dispersed or dissolved may also be used according to the invention. Such modified polyhydroxyl compounds are obtained when polyaddition reactions (e.g., reactions between polyisoisocyanates and amino functional compounds) or polycondensation reactions (e.g., between formaldehyde and phenols and/or amines) are carried out in situ in the above-mentioned hydroxyl compounds. Processes of this kind have been described, for example, in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833 and 2,550,862. These modified polyhydroxyl compounds can also be obtained according to U.S. Pat. No. 3,869,413 or German Offenlegungsschrift No. 2,550,860 by mixing a previously prepared aqueous polymer dispersion with a polyhydroxyl compound and then removing the water from the mixture.

When modified polyhydroxyl compounds such as those indicated above are used as starting components for the polyisocyanate polyaddition process, the polyurethane resins obtained in many cases have substantially improved mechanical properties.

Any mixtures of the above-mentioned polyhydroxyl compounds may be used in the process according to the invention. The polyols may also be mixed with other additives, such as chain lengthening agents, stabilizers, blowing agents, dyes, emulsifiers and water. However, it is preferred in making the dispersions according to the invention that pure polyols, without additives, be used.

In the scope of the present invention, polyether polyols are preferably used as polyhydroxyl compounds as they are particularly suitable for the production of the suspensions in the invention. Of particular interest in this case are those polyether polyols which may be obtained by known processes, are based on propylene oxide or ethylene oxide or mixtures thereof and have molecular weights between about 1800 and 7000. Of particular interest are those polyether polyols in which have incorporated between 3 and 45% by weight, preferably from 10 to 30%, by weight, of ethylene oxide. In this case, the ethylene oxide may be incorporated randomly, but is preferably present as a polymer block at the end of the polyether polyol chain or as a mixed block having incorporated within the polyether polyol chain a proportion of ethylene oxide of more than 30% by weight. Mixtures of the specified polyether types are also suitable.

In the preferred variation of the process according to the invention, free carboxyl groups are introduced into the polyhydroxyl compound in a first stage of the process by a radical initiated graft polymerization reaction with unsaturated carboxylic acids and optionally other olefinically unsaturated monomers, preferably in the absence of organic solvents, so that the polyhydroxyl compound acts as the sole reaction medium for the graft polymerization reaction.

If desired, the whole quantity of the polyol which is finally present as continuous phase in the suspensions according to the invention may be introduced into the graft polymerization reaction but it is preferable if at first only part of the total quantity of polyol which will finally be present as continuous phase in the suspension is subjected to graft polymerization and the resulting graft polymers are then diluted with an unmodified polyol which may be either the same as or different from the first mentioned polyol.

In this first, preferred embodiment of the process according to the invention, dispersion of the inorganic filler is carried out after graft polymerization, while the above-mentioned dilution with unmodified polyol, which should preferably be carried out, takes place before or after the process of dispersion. Dispersion is carried out with intimate mixing of the starting components over a period of from 0.1–12 hours at −30° to 180° C., preferably 5° to 45° C.

The dispersion process may also be carried out in the presence of solvents, e.g., water, acetone, ethyl acetate, methylene chloride, methanol, dimethyl formamide, toluene, chlorobenzene or dioxane. Any solvent used in the process is generally removed by distillation after the dispersion process.

The carboxyl groups of the graft polymer-stabilizer are completely or partially neutralized by organic or inorganic bases, before or preferably after the filler is dispersed in the stabilizer-containing polyol phase.

For this purpose, from 0.01 to 2, preferably from 0.1 to 1, in particular 0.5 to 1, particularly preferably about 1 base equivalent is used per carboxyl group. This may be carried out, for example, by stirring the base into the not yet neutralized solution of the stabilizer in polyol or, preferably, into the freshly produced dispersion of the filler in the stabilizer-containing polyol, with stirring. It is also possible to use the stabilizer itself in already partially or completely neutralized form if this appears to be preferable for commercial reasons.

Suitable inorganic bases for neutralization include, for example, oxides, (bi-)carbonates, silicates, alcoholates or, preferably, hydroxides of elements of main groups 1 to 3 of the periodic chart. Sodium hydroxide and calcium hydroxide are particularly preferred and the bases may be used both in aqueous solution and in solid form, or optionally as a powder.

Suitable organic bases preferably include primary, secondary or tertiary monoamines or polyamines which may be of aromatic, araliphatic, cycloaliphatic, heterocyclic or, preferably, aliphatic character. In practice, any amines which are capable of forming salts with carboxylic acid may be used. The following compounds are mentioned as examples:

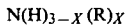

in which

X=0, 1, 2, or 3; and

R represents a methyl-, ethyl-, ethanol-, propyl-, isopropyl-, isopropanol-, butyl-, hexyl-, dodecyl-, stearyl-, oleyl-, isooctyl-, benzyl-, aminoethyl-, aminopropyl-, abietinyl-, aminopropyl-, phenyl-, or dimethylaminopropyl-radical.

Mixtures of bases or mixed substituted amines or oligomeric or polymeric or cyclic amines are also suitable. Ammonia, triethylamine, ethylene diamine and the N-substitution products thereof and ethanolamines and ethoxylization or propoxylization products thereof have proved particularly suitable. Amidines, enamines, guanidines or aziridines are suitable as neutralizers.

By graft polymers are preferably meant in the context of this invention those products which are obtained when, as described above, a polyol or mixture of polyols is mixed with an α,β-olefinically unsaturated carboxylic acid, optionally in the presence of a solvent, and optionally with the addition of other olefinically unsaturated monomers which are free from carboxylic acid groups. The mixture is then polymerized by radical polymerization, either by adding a radical former and heating to the decomposition temperature of the radical former or by heating the reaction mixture without the addition of radical former to a temperature at which thermal polymerization takes place. Polymerization may, of course, also be initiated by high energy radiation.

The known radical formers of polymerization chemistry may be used. Examples include those based on azo compounds or those based on peroxidic compounds or so-called Redox-systems. The following are examples of particularly suitable radical formers: azodiisobutyronitrile; dibenzoylperoxide; t-butyl peroxide; cumene hydroperoxide; di-t-butyl peroxide; dicumyl peroxide and, particularly, t-butyl peroxide and radical formers which are active at relatively low temperatures, e.g., peroxide/amine, peroxide/ascorbic acid, boron alkyl compounds/air, peroxide/$SO_2$, $H_2O_2/Fe^{2+}$ and peroxidic compounds which decompose at low temperatures, e.g., diisopropyl percarbonate.

The $\alpha,\beta$-unsaturated carboxylic acids used include maleic acid anhydride, maleic or fumaric acid or their semiesters and semiamides or itaconic acid, and particularly acrylic acid and methacrylic acid. Because of its ready availability, acrylic acid is the preferred $\alpha,\beta$-unsaturated carboxylic acid for the preparation of the graft polymers used according to the invention.

In general, from 1 to 35% by weight, preferably from 2 to 20% by weight, based on the total graft polymer, of the $\alpha,\beta$-unsaturated carboxylic acids are used for the production of the graft polymer. From 5 to 15% by weight of the $\alpha,\beta$-unsaturated carboxylic acid are advantageously used and the graft polymer obtained is subsequently added to the other unmodified polyol.

Other olefinically unsaturated monomers which may be used in quantities of up to 60% by weight, preferably from 5 to 40% by weight based on the total graft polymer include, for example, vinyl halides, vinyl esters, (meth)acrylonitrile, (meth)acrylamide, (meth)acrylester and maleic or fumaric or itaconic acid esters and vinyl aromatic substances. Vinyl acetate and vinyl propionate, (meth)acrylester and, in particular, styrene should be emphasized. It may sometimes be advantageous to use other polar monomers such as amino alkyl (meth)acrylates, oxyalkyl(meth)acrylates, N-alkyl(meth)acrylamides, vinyl pyrrolidone or vinyl pyridine.

These monomers which may be used in addition to the $\alpha,\beta$-unsaturated carboxylic acids occasionally improve the compatibility of the graft polymer in the polyol as well as the stability of the suspension of the invention.

Particularly preferred for the invention are graft (co)-polymers of polyether polyols, acrylic acid or methacrylic acid and optionally styrene, because these graft polymers are generally readily soluble in the unmodified polyols.

The graft polymers may be produced in situ, as already stated, for example by mixing the entire quantity of polyol provided for producing the suspension with the $\alpha,\beta$-unsaturated carboxylic acid, and the optional other monomers, and then carrying out polymerization. However, the graft polymer is preferably produced separately and then added to the initial suspension, in quantities of from 0.05 to 10%, preferably from 0.2 to 3%, by weight, based on the polyol plus filler.

The stabilized suspensions of inorganic fillers in polyols obtained according to the invention contain between about 0.5% by weight and 80% by weight of filler. The filler contents are preferably between 10 and 45% by weight, most preferably between 15 and 35% by weight, based on the total suspension.

For applications in which increased viscosity of the suspension is not prohibitive, higher filler contents may be used.

Sedimentation of the filler in the formerly known filler-containing polyols is shown by two effects. For example, if a test tube is filled with an unstable suspension of this type, a clear layer of the polyhydroxyl compound, now containing almost no filler, is soon formed in the space directly beneath the surface of the liquid. Furthermore, a deposit of particles of filler is precipitated on the bottom of the test tube so that, after a short period, three layers which are more or less clearly separated from each other may be observed.

It has been found that the first-mentioned effect of serum-like separation of the dispersant on the surface may be reduced very reliably by the process of the invention. Nevertheless, some filler suspensions still tend to form incrustations on the bottom of the storage container. It has been found that this undesirable phenomenon can also be suppressed if, when producing the suspension in such cases, i.e. when and after working in the filler, temperatures above 60° C. are avoided and the process is carried out at a temperature in the range of from −30° to +60° C., preferably from +5° to 45° C. This is surprising since the reactions between a polymer containing carboxyl groups and the surface of the filler particle which are probably decisive in stabilizing the suspension, would be expected to take place more rapidly and more completely at high temperatures than at low temperatures.

According to another variation for the production of these suspensions according to the invention, it is also possible to carry out the dispersion process and the graft polymerization reactions in a one-pot process. In this process, a mixture of unmodified polyol, inorganic filler, unsaturated carboxylic acid, optionally radical-forming agents and optionally other olefinically unsaturated monomers is mixed thoroughly at a temperature above the decomposition temperature of the radical-forming agent, i.e. at from −30° to 180° C., preferably from +5° to 45° C., for a period of from 0.5 to 12 hours, and is subsequently neutralized.

The suspensions prepared according to the invention may still be degasified, gassed, dried or mixed with additives. They may also be mixed with other fillers or with polyols containing fillers. They are also suitable for use as starting material for the preparation of other types of modified polyols, for example, as starting material for the preparation of so-called polymer polyols, e.g., by grafting them with styrene-acrylonitrile mixtures as described in, e.g., U.S. Pat. Nos. 3,383,351; 3,304,351; 3,304,273; 3,523,093 and 3,110,695 already mentioned above and German Pat. No. 1,152,536. Other organic filler particles such as particles of polyureas or polyhydrazo dicarbonamides may be prepared in them in situ as described in German Auslegeschriften Nos. 1,168,075 and 1,260,142 and German Offenlegungsschriften Nos. 2,324,134; 2,423,984; 2,512,385; 2,513,815; 2,550,796; 2,550,797; 2,550,833 and 2,550,862. The suspensions according to the invention are particularly valuable starting materials for the preparation of polyurethanes by the isocyanate polyaddition process. They are suitable for the production of flexible, rigid and semi-rigid foamed polyurethane resins as well as for the production of unfoamed polyurethanes, for example, polyurethane elastomers or duromers.

For this purpose, the suspensions according to the invention are reacted in a manner known per se with polyisocyanates and optionally other high and/or lower molecular polyhydroxyl compounds or polyamines, optionally in the presence of catalysts, blowing agents, stabilizers and other additives known per se, wherein both a one-shot and a pre-polymer or semi-prepolymer process may be adopted.

The preparation of the suspensions will be explained below with the aid of examples.

The percentages and parts given are percentages by weight and parts by weight unless otherwise indicated.

Fillers having the following designations were used for the following examples:

Filler D: Crystalline Pyrenean Calcite; upper section: 10 μm; average particle diameter: 3 μm; smaller than 2 μm; 40%;

Filler E: Dolomite; upper section: 9 μm; particle diameter on average 3 μm; finer than 2 μm; 65%;

Filler M: Urgonic calcite; residue on 40 μm sieve: less than 0.1%; upper section: 10 μm; average particle diameter: 3 μm; finer than 2 μm: 35%;

Filler O: Microcrystalline Champagne chalk; Upper section: 5 μm; average particle diameter: 1 μm; finer than 2 μm: 90%;

Filler H: Crystalline Calcium carbonate; upper section: 7 μm; average particle diameter: 1.5 μm; finer than 2 μm: 70%.

The following polyols are used in the examples:

Polyol 1: Polyether started on trimethylol propane and prepared from 83% of propylene oxide and finally 17% of ethylene oxide, hydroxyl No.: 28;

Polyol 2: Polyether, started on glycerine and prepared from 90% of propylene oxide and finally 10% of ethylene oxide; hydroxyl No.: 38;

Polyol 3: Polypropylene oxide started on trimethylol propane; hydroxyl No.: 56;

Polyol 4: Polyether started on propylene glycol and prepared from 80% of propylene oxide and finally 20% of ethylene oxide; hydroxyl No.: 28;

Polyol 5: Polyether started on trimethylol propane from 75% of propylene oxide and 25% of ethylene oxide; hydroxyl No.: 35.

The graft polymers used as stabilizer were produced by the following general method:

The polyol (A parts), acrylic acid (B parts), styrene (C parts) and t-butylperoctoate (1% of the sum A+B+C) are introduced into a stirrer crucible filled with nitrogen. The mixture is then maintained at 95° C. for eight hours with stirring so that graft polymerization takes place with an increase in viscosity. The reaction mixture or the neutralization product thereof may be used directly as stabilizer.

Assuming that A+B+C=100, the graft polymers are characterized below in brief by the polyol number, the quantity of acid used and the quantity of styrene used. Stabilizer 1/10/20 would thus be the graft polymer from 70% of polyol 1, 10% of acrylic acid and 20% of styrene.

The suspensions are produced by the following general method:

The stabilizer is dissolved in the basic polyol and the filler is then added at a predetermined temperature. The mixture is stirred intensively for an additional hour at the temperature specified and a stable suspension is obtained. This is added to the base provided for neutralization or partial neutralization, optionally with thorough stirring, and the mixture is subsequently stirred intensively for an additional hour.

The type of base used for neutralization in each case, and the degree of neutralization in percent are given in the table below, in which 100% neutralization is stated if one base equivalent is used per mol of carboxyl groups present in the stabilizer.

The following bases were used in the examples:
a: 4-molar aqueous sodium hydroxide
b: Calcium hydroxide, micronized
c: Triethylamine
d: Amine prepared from one mol of oleic acid and one mol of triethylenetetramine
e: Ethylenediamine
f: Ethanolamine
g: Ammonia gas
h: 1,4-diaza-bicyclo-(2,2,2) octane
i: triethylenetetramine.

The sedimentation stability of the suspensions was evaluated in the experiments described below.

The suspension to be tested was poured in a layer of 10 cm depth into a cylindrical test tube. The test tube was placed in a warming cabinet at 45° C. and left there for 88 hours. The precipitation of polyol was then evaluated with good illumination as a more or less clear surface layer, as follows:

Scale of upper sedimentation ($S_1$)

$S_1 = 1$: No precipitation observed
2: Precipitation less than 1 mm thick
3: Precipitation between 1 and 3 mm thick
4: Precipitation more than 3 mm thick.

An examination was then carried out with good illumination to find out whether a bottom layer with sedimentation level had been deposited on the bottom of the cylindrical test tube. Evaluation was carried out as follows:

Scale of lower sedimentation ($S_2$)

$S_2 = 1$: No precipitation observed
2: Indication of a sedimentation level
3: Clear precipitation of a bottom layer Finally, the appearance of the samples stored at 45° C. was evaluated:

$V = 1$: Homogeneous, perfectly fusible;
2: Coagulated, curdy, flocculent, but still fusible;
3: Thickened, coagulated, set, barely fusible.

From the point of view of application, the type $V = 1$ is suitable for the intended applications while coagulation phenomena and thickening lead to inhomogeneity and more difficult handling and are less suitable.

| Example No. | 1 | 2 | 3 | 4 | 5 | 6 | 7 | 8 | 9 | 10 |
|---|---|---|---|---|---|---|---|---|---|---|
| Type of Polyol | 1 | 1 | 1 | 1 | 1 | 1 | 1 | 2 | 2 | 3 |
| Type of Filler | D | D | D | E | M | O | H | D | D | D |
| Filler content of the suspension (%) | 30 | 30 | 30 | 30 | 30 | 30 | 30 | 30 | 30 | 30 |
| Type of Stabilizer | — | 1/10/10 | 2/10/20 | 1/10/10 | 1/10/20 | 1/10/10 | 1/10/10 | — | 2/10/20 | — |
| Stabilizer content of the suspension (%) | — | 0.6 | 0.5 | 0.7 | 0.4 | 0.8 | 0.9 | — | 0.6 | — |
| Type of Base | — | c | c | c | g | c | c | — | f | — |
| Degree of Neutralization (%) | — | 10 | 100 | 80 | 50 | 100 | 30 | — | 50 | — |

-continued

| | | | | | | | | | | |
|---|---|---|---|---|---|---|---|---|---|---|
| Production temperature °C. | 20 | 25 | 20 | 28 | 22 | 22 | 20 | 25 | 23 | 22 |
| Evaluation $S_1$ | 3 | 1 | 1 | 1 | 1 | 1 | 2 | 2 | 1 | 3 |
| Evaluation $S_2$ | 3 | 2 | 1 | 2 | 1 | 2 | 1 | 3 | 1 | 3 |
| Evaluation V | 1-2 | 1 | 1 | 1 | 1 | 1 | 1 | 1-2 | 1 | 2 |

| Example No. | 11 | 12 | 13 | 14 | 15 | 16 | 17 | 18 | 19 | 20 |
|---|---|---|---|---|---|---|---|---|---|---|
| Type of Polyol | 3 | 3 | 3 | 4 | 4 | 5 | 5 | 5 | 5 | 5 |
| Type of Filler | D | D | D | D | D | D | D | D | D | D |
| Filler content of the suspension (%) | 30 | 30 | 30 | 30 | 30 | 15 | 30 | 15 | 30 | 15 |
| Type of Stabilizer | 3/10/30 | 3/10/30 | 3/10/30 | — | 4/10/10 | — | — | 5/10/10 | 5/10/10 | 5/10/10 |
| Stabilizer content of the suspension (%) | 0.25 | 0.5 | 0.3 | — | 0.6 | — | — | 1.2 | 0.5 | 1.2 |
| Type of Base | c | h | — | — | c | — | — | — | — | i* |
| Degree of Neutralization (%) | 90 | 100 | — | — | 85 | — | — | — | — | 50 |
| Production temperature °C. | 25 | 25 | 25 | 25 | 22 | 25 | 25 | 23 | 23 | 23 |
| Evaluation $S_1$ | 1 | 1 | 1 | 2 | 1 | 3 | 2 | 1 | 1 | 2 |
| Evaluation $S_2$ | 1 | 1 | 1 | 3 | 1 | 3 | 2 | 2 | 1 | 1 |
| Evaluation V | 1 | 1 | 1 | 1-2 | 1 | 2 | 3 | 1 | 1 | 1 |

| Example No. | 21 | 22 | 23 | 24 | 25 | 26 | 27 | 28 | 29 | 30 |
|---|---|---|---|---|---|---|---|---|---|---|
| Type of Polyol | 5 | 5 | 5 | 5 | 5 | 5 | 5 | 5 | 5 | 5 |
| Type of Filler | D | D | D | D | 0 | D | D | D | D | D |
| Filler content of the suspension (%) | 30 | 30 | 30 | 30 | 30 | 30 | 30 | 30 | 40 | 40 |
| Type of Stabilizer | 5/10/10 | 5/10/10 | 5/10/10 | 5/10/10 | 5/10/10 | 1/10/20 | 5/10/10 | 5/10/10 | 5/10/20 | 5/10/10 |
| Stabilizer content of the suspension (%) | 0.5 | 0.5 | 0.5 | 1.5 | 0.75 | 0.3 | 0.5 | 0.55 | 0.75 | 0.75 |
| Type of Base | c | b | a | a | h | c | d | e | c | c |
| Degree of Neutralization (%) | 95 | 100 | 100 | 90 | 100 | 100 | 100 | 95 | 6 | 12 |
| Production temperature °C. | 23 | 23 | 23 | 23 | 22 | 20 | 20 | 20 | 26 | 26 |
| Evaluation $S_1$ | 1 | 1 | 1 | 1 | 1 | 1 | 1 | 1 | 1 | 1 |
| Evaluation $S_2$ | 1 | 1-2 | 1 | 1-2 | 1 | 1 | 1 | 1-2 | 1-2 | 1 |
| Evaluation V | 1 | 1 | 1 | 1 | 1 | 1 | 1 | 1 | 1 | 1 |

*Base was added to the sediment before filler was added.

It is seen from the examples, the results of which are given in the tables, that the graft polymers added in the proportions claimed according to the invention clearly have a stabilizing effect.

The addition of both organic and inorganic bases for neutralization purposes does not impair the stabilizing effect, but rather an improvement is indicated. It is thus possible to obtain dispersions which are stable in storage according to the invention and whose content of free carboxyl groups may be adjusted to the requirements of the isocyanate polyaddition process.

With the aid of the dispersions produced in Examples 26, 27 and 28, processing to foamed polyurethane resins is to be shown by way of example:

33.3 parts of the appropriate dispersion are diluted with 66.7 parts of a polyether obtained by adding 87 parts of propylene oxide and 13 parts of ethylene oxide to trimethylol propane and having a hydroxyl number of 28.

The following are then added rapidly with stirring:
2.9 parts of water;
0.5 parts of diazabicyclooctane;
0.8 parts of N-methylmorpholine;
0.1 parts of bis-(N,N-dimethylaminoethyl)-ether;
0.03 parts of dibutyl tin dilaurate and
1.1 parts of a commercial polyethersiloxane foam stabilizer and subsequently 36 parts of a mixture having an isocyanate content of 44.5% prepared from 80% of tolylene diisocyanate and 20% of a commercial crude diphenylmethanediisocyanate.

Foaming takes place without any problems. The foam obtained has a bulk density of 40 kg/m³ and the following mechanical properties:

| | Dispersion | | |
|---|---|---|---|
| | 26 | 27 | 28 |
| Tensile strength (KPa) (DIN 53 571) | 140 | 135 | 140 |
| Elongation at break (%) (DIN 53 571) | 200 | 180 | 175 |
| Compression Hardness at 40% (KPa) (DIN 53 577) | 3.6 | 3.7 | 3.7 |
| Compression set at 90% (%) (DIN 53 572) | 14.0 | 14.2 | 14.4 |

In order to foam the comparable but unneutralized dispersions from Examples 13, 18 and 19, the quantity of the silicon stabilizer must be increased by about 25% and the quantity of the basic mixer catalyst must be increased by about 15% so as to obtain comparable foams.

The good ratio of breaking elongation to compression hardness allows cushion foams having a very high load-bearing capacity but low weight to be produced from the dispersions according to the invention.

What is claimed is:

1. A suspension which is stable in storage comprising:
(1) 0.5 to 80%, by weight, based on the total suspension, of an inorganic filler in
(2) 20 to 99.5%, by weight, based on the total suspension, of polyhydroxyl compounds containing aliphatic or cycloaliphatic combined hydroxyl groups,
wherein said polyhydroxyl compounds (2) contain from 0.05 to 10% by weight based on (1)+(2) of a graft polymer and stabilizer which was produced by the free-radical polymerization of
(a) from 1 to 35%, by weight, based on the graft polymer, of an olefinically unsaturated carboxylic acid and
(b) from 0 to 60%, by weight, based on the graft polymer, of other olefinically unsaturated monomers, in the presence of
(c) from 5 to 99%, by weight, based on the graft polymer, of polyhydroxyl compounds, the improvement
wherein the carboxyl groups of the graft polymer are completely or partially neutralized by organic or inorganic bases.

2. The suspension of claim 1, wherein said polyhydroxyl compounds contain 2 to 8 hydroxyl groups and have a molecular weight above 500.

3. The suspension of claim 2, wherein said polyhydroxyl compounds contain 2 to 3 hydroxyl groups and have a molecular weight between 1,800 and 7,000.

4. The suspension of claim 2 further comprising up to 70%, by weight, based on the total polyhydroxyl compounds present, of polyhydroxyl compounds having a molecular weight between 62 and 500.

5. The suspensions of claim 2, wherein said polyhydroxyl compounds are polyether polyols.

6. The suspension of claim 5, wherein said polyether polyols have incorporated therein 3 to 45%, by weight, based on the total weight of said polyols, ethylene oxide.

7. The suspension of claim 6, wherein said ethylene oxide content is 10 to 30%.

8. The suspension of claim 5, wherein up to 90%, based on all the hydroxyl groups present, are primary hydroxyl groups.

9. The suspension of claim 1, wherein said inorganic filler is based on calcium carbonate.

10. The suspension of claim 1, wherein (meth)acrylic acid is used as said olefinically unsaturated carboxylic acid.

11. The suspension of claim 10, wherein styrene is used as said other unsaturated monomer.

12. The suspension of claim 1, wherein production is carried out at temperatures of between −30° to 180° C.

13. The suspension of claim 12, wherein production is carried out at temperatures of between 5° to 45° C., for a period of from 0.1 to 12 hours.

14. The suspension of claim 1 wherein said polyhydroxyl component (2) contains from 0.1 to 3%, by weight, based on (1)+(2) of said graft polymer and stabilizer.

15. The suspension of claim 1 wherein said graft polymer and stabilizer was produced by radical polymerization of (a) from 2 to 20%, by weight, based on the graft polymer, of said olefinically unsaturated carboxylic acid and (b) from 5 to 40%, by weight, based on the graft polymer, of said other unsaturated monomers.

16. The suspension of claim 1, wherein said inorganic bases are selected from the group consisting of oxides, (bi-) carbonates, silicates, alcoholates, and hydroxides.

17. The suspension of claim 16, wherein said inorganic bases are selected from the group consisting of sodium hydroxide and calcium hydroxide.

18. The suspension of claim 1, wherein said organic bases are of the formula:

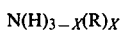

wherein
X which may be the same or different, represents 0, 1, 2 or 3; and
R represents a methyl-, ethyl-, ethanol-, propyl-, isopropyl-, isopropanol-, butyl-, hexyl-, dodecyl-, stearyl-, oleyl, isooctyl-, benzyl, aminoethyl-, aminopropyl-, abietinyl-, aminopropyl-, phenyl-, or dimethylaminopropyl-radical.

19. The suspension of claim 1, wherein said organic bases are selected from the group consisting of triethylamine, ethylenediamine, ethanolamine, triethylenetetramine, and ammonia gas.

20. The suspension of claim 1, wherein 0.01 to 2 equivalents of said base is used per carboxyl group.

21. The suspension of claim 20, wherein 0.1 to 1 equivalent of said base is used per carboxyl group.

22. The suspension of claim 1, wherein 0.05 to 1 equivalent of said base is used per carboxyl group.

23. The suspension of claim 1, wherein 10 to 45%, by weight, based on the total suspension, is inorganic filler.

24. The suspension of claim 23, wherein 15 to 35%, by weight, based on the total suspension is inorganic filler.

* * * * *